WALTER D'ARCY RYAN.
VEHICLE HEADLIGHT.
APPLICATION FILED DEC. 17, 1921.

1,428,662. Patented Sept. 12, 1922.

Inventor
Walter D'Arcy Ryan
By his Attorneys Dodson & Roe

Patented Sept. 12, 1922.

1,428,662

UNITED STATES PATENT OFFICE.

WALTER D'ARCY RYAN, OF SCHENECTADY, NEW YORK.

VEHICLE HEADLIGHT.

Application filed December 17, 1921. Serial No. 523,033.

*To all whom it may concern:*

Be it known that I, WALTER D'ARCY RYAN, a citizen of the United States, residing at Schenectady, in the county of Schenectady, and State of New York, have invented a new and useful Improvement in Vehicle Headlights, of which the following is a specification.

My invention relates to the art of illumination, and particularly to the class adapted for projecting light beams from moving vehicles, such as automobiles, trains, street cars, and the like.

In the many devices heretofore produced by inventors and experts for this purpose, they have endeavored to solve the problem of adequate and sufficient illumination for the operator, together with the absence of objectionable glare to an approaching driver, by surrounding one given source of light with many and various deflecting redirecting, absorbing, and other, mediums, all designed in their respective combinations, to so control the light rays of the single source as to produce the desired effect.

The object of my invention is to combine a plurality of light sources, with such surrounding controlling means as I shall describe, to jointly function to produce the result.

Figure 1:
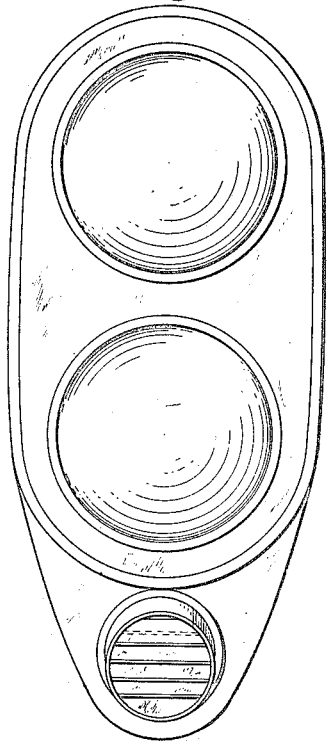
Figure 2:
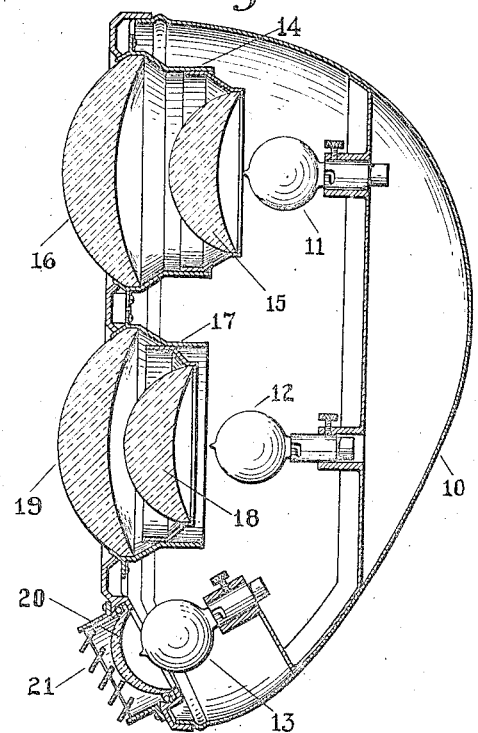

My invention consists of the details of construction hereinafter set forth, pointed out in my claims and illustrative in the accompanying drawing, in which Figure 1 shows a front elevational view of a headlight provided with my device;

Figure 2 shows a longitudinal sectional view of the same, some of the parts being in elevation.

Referring to the accompanying drawings, the reference numeral 10 is used to indicate a headlight housing in which I have mounted three lamps 11, 12 and 13, respectively, by any of the ordinary means. These lamps are each provided with current-supplying wires (not shown) to provide light. Mounted in the front of the headlight casing, and near the top thereof, and in proper position to the lamp 11, is a frame 14 designed to contain, and rigidly support, a pair of lenses, 15 and 16 respectively, each of which are, preferably, concavo-convex, but of different size and different radii of their convex surfaces. The lens 15 is mounted nearest the lamp 11, and is the smaller of the two, and has its convex surface formed on a smaller radius than that of the convex surface of the lens 16. The said lens 15 is for the purpose of gathering the maximum amount of light and is constructed, and positioned, for that purpose. The lens 16 is for the purpose of concentrating the light received from the lens 15, and projecting it, in a long and relatively narrow beam, forwardly from the headlight, and is constructed and positioned, with relation to the lens 15, for that purpose. There is, preferably, no reflector for this combination.

Mounted in the front of the headlight casing, and below the frame 14, and in proper position to the lamp 12, is a frame 17, designed to contain, and rigidly support, a pair of lenses, 18 and 19 respectively, each of which are, preferably, concavo-convex. but also of different size and different radii of their convex surfaces. The lens 18, like the lens 15, is for the purpose of gathering the maximum amount of light from the lamp 12, and is positioned and formed for that purpose, and the lens 19 is for the purpose of receiving the rays from the lens 18, and dispersing them in front of the headlight, but, unlike the lens 16, it is not designed to project a long, narrow beam of light but a wider beam and nearer to the headlight, and the lens 19 is positioned and formed for that purpose. The lens combination for the lamp 11 and the lens combination for the lamp 12, are designed to function together to form a continuous long strip of light from a distance shortly in advance of the headlight, to a long distance therefrom, such as from three hundred to five hundred feet.

This combination does not provide side lighting and adjacent advance lighting for the machine, and I accomplish this result by providing any convenient shaped lens 20, in front of the lamp 13, and a reflector may, if desired, be used to surround this lamp. To insure against any direct rays of light being projected in a glaring condition from the lamp 13, or the reflector if used, I have mounted parallel shutters 21 in front of the lens 20 to receive the rays of light and deflect them downwardly to a point close in front of the machine.

It is customary to have two headlights for each automobile and, when my device is applied to an automobile I position the lamps 11, in their respective headlights, so that the beams of light will cross each other at a pre-determined distance from the machine, preferably about three hundred feet. By this arrangement the beams after crossing go off to the sides of the road and are lost, so that they will not interfere with the vision of an approaching person.

In practical operation this arrangement has proven to be most satisfactory and to practically eliminate all glare.

Although I have described my invention as applied to an automobile I want it understood it can be utilized for all analogous purposes, and that one headlight will function as satisfactorily as a pair will do, and that the one headlight would not be dependent upon any particular positioning on the front of the car for its satisfactory functioning.

Having thus described my invention, what I claim and desire to secure by Letters Patent of the United States, is:

1. A headlight composed of a three unit combination, the first unit comprising a light source and two jointly functioning lens to gather the light rays and project them forwardly in a long, narrow and glareless beam; the second unit comprising a light source and two jointly functioning lenses to gather and disperse the light rays in a broad, glareless, manner, in the field between the long beam and near the vehicle, the third unit comprising a light source, and a deflecting medium to deflect the rays to the roadway immediately in advance of the machine; and to the sides thereof, substantially as shown and described.

2. A headlight composed of an elongated casing with three light projecting units, a plate support for three light sources, one for each unit, a system of lenses in front of one light source constructed and arranged to project the rays of light in a concentrated beam far in advance of the machine, a second system of lenses in front of the second light source constructed and arranged to spread the light rays in advance of the machine and in relatively close proximity thereto, and deflecting means in front of the third light source constructed and arranged to deflect the light rays downwardly immediately in front, and to the sides of the machine.

WALTER D'ARCY RYAN.